United States Patent [19]
Shermetaro et al.

[11] Patent Number: 5,303,952
[45] Date of Patent: Apr. 19, 1994

[54] ELECTRIC SIGNALLING IN A SUPPLEMENTAL VEHICLE RESTRAINT SYSTEM

[75] Inventors: Mark Shermetaro, Rochester; Joseph J. Mannino, Chesterfield; Robert P. Reighard, Petersburg; Kevin K. Ritter, Temperance; Paul R. Chandler, Saline, all of Mich.

[73] Assignee: United Technologies Automotive, Inc., Dearborn, Mich.

[21] Appl. No.: 997,272

[22] Filed: Dec. 23, 1992

[51] Int. Cl.$^5$ .............................................. B60R 21/16
[52] U.S. Cl. .................................. 280/731; 200/61.55
[58] Field of Search ................... 280/731, 61.54, 61.55

[56] References Cited

U.S. PATENT DOCUMENTS

| | | | |
|---|---|---|---|
| 3,819,205 | 6/1974 | Dunford et al. | 280/150 |
| 4,325,568 | 4/1982 | Clark et al. | 280/731 |
| 4,785,144 | 11/1988 | Fosnaugh et al. | 200/61.55 |
| 4,808,776 | 2/1989 | Niwa et al. | 200/61.55 |
| 4,872,364 | 10/1989 | Kaga et al. | 74/484 H |
| 4,934,735 | 6/1990 | Embach | 280/731 |
| 4,938,503 | 7/1990 | Muraoka et al. | 280/731 |
| 5,001,311 | 3/1991 | Sakane | 200/61.54 |
| 5,056,814 | 10/1991 | Shiraki et al. | 280/731 |
| 5,085,461 | 2/1992 | Shibata | 280/731 |
| 5,120,912 | 6/1992 | Sharp | 200/16 R |
| 5,149,127 | 9/1992 | Manabe et al. | 280/731 |

FOREIGN PATENT DOCUMENTS 9114601 10/1991 World Int. Prop. O. .......... 280/731

OTHER PUBLICATIONS

SAE Technical Paper Series entitled "Flexible Circuitry Applications for Automotive Instrumentation", by Keith L. Casson of Sheldahl, Inc., presented at the International Congress and Exposition, Detroit, Michigan, Feb. 26–Mar. 2, 1990.
Sheldahl, Inc.; Advertising Brochure entitled "Z-Link Multilayer Process", undated.
Interlink Electronics, Advertising Brochure entitlted "Touch The Future . . . through . . . Force Sensing Resistors", undated.
Interlink Electronics, FSR Technical Specifications, dated Aug. 15, 1989.

Primary Examiner—Margaret A. Focarino
Assistant Examiner—Christopher P. Ellis
Attorney, Agent, or Firm—W. W. Habelt

[57] ABSTRACT

Electrical connections between a motor vehicle wire harness (32) and an air bag module (65) are made by a unitary switching module (55) provided with accessory switches (57) therein and electrical connectors (112) which receive mating connectors from the wire harness and electrical accessory controls (35 and 40) disposed on the steering wheel.

21 Claims, 4 Drawing Sheets

ELECTRIC SIGNALLING IN A SUPPLEMENTAL VEHICLE RESTRAINT SYSTEM

TECHNICAL FIELD

This invention relates generally to the operation of a motor vehicle's electrical accessories and, more specifically, to the actuation of such accessories by manipulation of an air bag module employed in a supplemental restraint system.

BACKGROUND ART

In the evolution of automotive design, great importance has recently been placed on automotive safety and ergonomics. Modern automobiles are provided with many safety systems to protect both the vehicle itself and its passengers, in the event of a collision. Among such safety systems is the supplemental passenger restraint system for the front seat occupants of the vehicle. This system, oftentimes referred to as an air bag system, is provided in the hub of the steering wheel for the vehicle driver and occasionally, at the right-hand end of the vehicle's instrument panel for the front seat passenger.

In the case of the driver's side supplemental restraint system, the hub of the steering wheel houses an air bag, a rapidly combustible material which when burned, gives off gases which inflate the bag and an ignition system for initiating the combustion. The hub is covered by a soft, frangible, flexible cover which tears open under the force of air bag inflation, thereby allowing the bag to fill the area of the passenger compartment between the driver and the steering wheel as the bag inflates. The flexibility of the cover contributes to the frangibility thereof, provides a soft shock absorbing surface to reduce the risk of injury during minor incidents in which the air bag does not deploy, and provides an aesthetically pleasing extension of the colors and textures employed in other parts of the vehicle's passenger compartment.

One of the primary goals of modern ergonomic vehicle design is to provide controls which are conveniently accessible to the driver with a minimum of diversion of the drivers attention from the road. Since the vehicle's accessories are, for the most part, manually actuatable and operable, accessories such as horns, cruise controls and the like are conveniently operable from the steering wheel itself. Historically, horn buttons (switches) were positioned at the center of the steering wheel and studies have shown that drivers who are not completely familiar with the operation of a vehicle will instinctively reach for the center of the steering wheel when they wish to operate the horn. However, prior art horn buttons have not generally been conducive for use with steering wheels having flexible air bag covers. Thus, automotive interior designers have been forced to move horn buttons to the spokes of the steering wheel and, in some cases, to stalks extending outwardly from the steering column. Both locations have been found to be more inconvenient than the center of the steering wheel from the standpoint of the driver.

Recently, conventional horn switches have been mounted in vehicle steering wheel hubs beneath air bag modules containing the bag, a gas generator and an ignitor so that when it is desired to actuate the horn, the driver depresses the entire air bag module. Typically, a plurality of horn switches are connected in parallel to the vehicle's wiring within the hub of the steering wheel, below the air bag module such that actuation of any single switch will activate the horn. Heretofore, it has been the practice to employ stamped metal or wire conductors to connect such horn switches to the vehicle's wiring by such prior art connectors as crimp or screw-type connectors. Such arrangements exhibit a number of significant shortcomings. For example, use of individual wires and/or metal stampings requires substantial hand labor during vehicle assembly operations and, therefore, contributes significantly to the cost of steering wheel assembly. Moreover, such stamped metal connectors and individual wires are also subject to damage from overlying components in the supplemental restraint system when the steering wheel is assembled. In fact, it is oftentimes necessary to employ wire retention clips to position the wires so as not to be so damaged, to employ shields to protect the wires from such damage, both of which add to the bulk and complexity of the steering wheel assembly and contribute further to the manufacturing costs thereof.

Moreover, with the prior art connection techniques mentioned hereinabove, there is significant risk of assembly error. That is, right-hand and left-hand conductor stampings risk being inadvertently reversed in vehicle assembly operations, often resulting in inoperability of the electrical system within the steering wheel or damage to the horn switch connections during subsequent assembly operations. Quality control testing of such systems is also inconvenient in that it must be performed within the vehicle as the vehicle undergoes further assembly.

Accordingly, an improved scheme for making electrical connections to vehicle accessory switches such as horn switches and the like in a steering wheel hub beneath an air bag module, characterized by simplicity and reliability of structure, economy of manufacture, and ease of assembly and testing is desirable.

DISCLOSURE OF INVENTION

In accordance with the present invention, switches for horns or other vehicle accessories disposed within the passenger compartment of a motor vehicle beneath an air bag module are connected to the vehicle's electrical accessory wiring by a generally unitary, electric switching module comprising electrical circuitry embedded within a housing, the accessory switches being connected to such circuitry. The electrical circuitry may include integral, plug and socket—connectors which connect electrical components of the air bag module, the accessory switches in the switching module and any nearby switches and controls to the vehicle's accessory wiring. The electric switching module is particularly useful in the environment of a steering wheel hub where the integral electrical connectors connect the horn switches as well as the switches for any steering wheel mounted controls such as cruise controls, radio controls and the like to the vehicle accessory wiring.

The unitary switching module may comprise a rigid, insulative material such as an injection molded plastic, with the electrical circuitry comprising a metal stamping or the like embedded in the insulative material as by insert molding. The module is bolted to the steering wheel hub, the bolts serving as guides for reciprocal movement of brackets on which an air bag module is mounted. Depression of the module moves the brackets downwardly, engaging one or more horn switches which form part of the circuitry.

In an alternate embodiment, the electrical circuitry comprises a thin, electrically conductive leaf coated with a flexible, electrically insulative coating such as a flexible plastic. The accessory switches integral with the module's circuitry may be any of a variety of known miniature switches such as dome switches, thin film switches such as force sensing resistors, piezoelectric elements, conductive inks, pressure sensitive electrically conductive adhesives and the like. Such a thin film switching module may be attached to an underlying support such as the steering wheel hub noted above by any suitable means such as a screw clamps, adhesive bonding or the like. Screw clamps could also function as guides for movement of the overlying air bag module.

Modularizing the circuitry which connects the accessory switches to the vehicle wiring and the switches themselves in the manner described herein overcomes the deficiencies exhibited by prior art connections. Since the switching module is unitary, it is easily and economically assembled into the vehicle. With the use of proper guides, risk of assembly of the module in any orientation other than the correct orientation is, for the most part, nil. Since the switches and circuitry are safely protected inside the switching module, the need for wire alignment clips and protective shields and the risk of damaging individual or equivalent conductors (wires) in subsequent assembly operations are also eliminated. The module is capable of being electrically tested at the point of manufacture rather than at the point of assembly with the vehicle, for enhanced reliability.

BEST MODE FOR CARRYING OUT THE INVENTION

Figure 1:
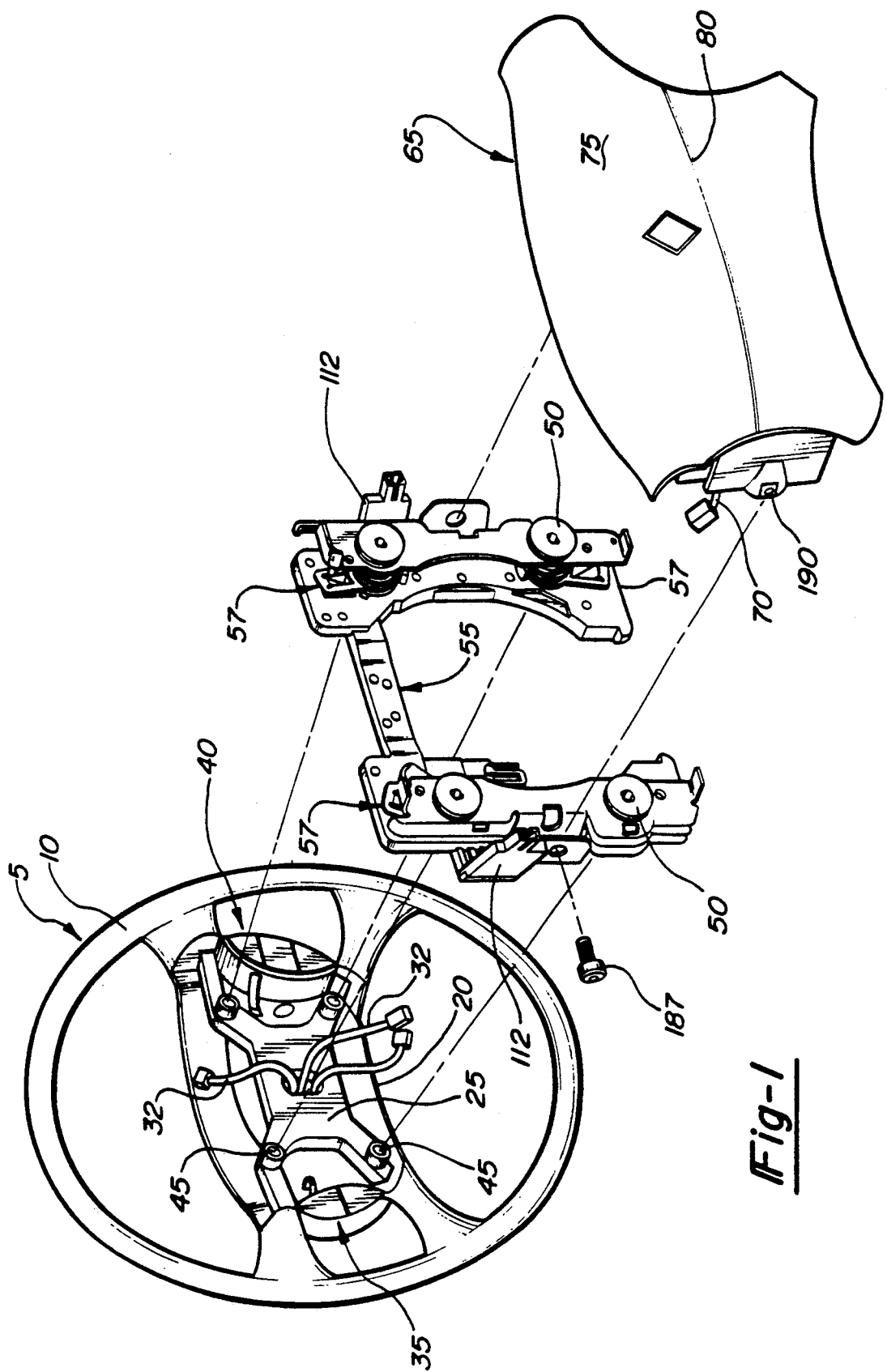
FIG. 1 is an exploded perspective view of a vehicle steering wheel of the type in which the present invention is employed.

Referring to FIG. 1, a motor vehicle steering wheel is shown generally at 5 comprising a circular rim 10 having spokes 15 extending generally inwardly therefrom and a hub 20 disposed in the center of the wheel at the radially inward termination of the spokes. Steering wheel 5 may be manufactured in accordance with any of various known techniques such as the molding of a thermosetting plastic around a welded metal frame.

Still referring to FIG. 1, hub 15 is provided with a reinforced central portion 25 apertured at 30 to receive wiring 32 connecting electrical accessory controls mounted on the steering wheel with the vehicle's wiring harness. By way of example, wiring 32 connects the main vehicle harness to switches 35 which function to turn the vehicle's cruise control on and off and switches 40 for choosing the mode of operation and speed settings for the cruise control, as well as any electric ignitors for the air bag gas generator. The hub also includes four threaded holes 45 which receive shoulder bolts 50. Shoulder bolts 50 secure electric switching module 55 including at the corners thereof, mechanical horn switches 57 and a mounting bracket 60 on which air bag module 65 is mounted, to the steering wheel hub.

Those skilled in the art will immediately recognize that air bag module 65 comprises an air bag, a gas generator, the products of combustion of which inflate the air bag, and a means for igniting the gas generator. As is well known, deceleration sensors (not shown) disposed at various locations throughout the motor vehicle send an electric signal to the electric ignitors through wire 70 when a severe deceleration indicative of impact of the vehicle with another object is sensed. This electric signal causes the ignitors to ignite the gas generating compound, inflating the air bag which brakes open the decorative outer cover 75 along tear seam 80, thereby cushioning the impact of the driver of the vehicle with the steering wheel instrument panel and windshield.

Figure 2:
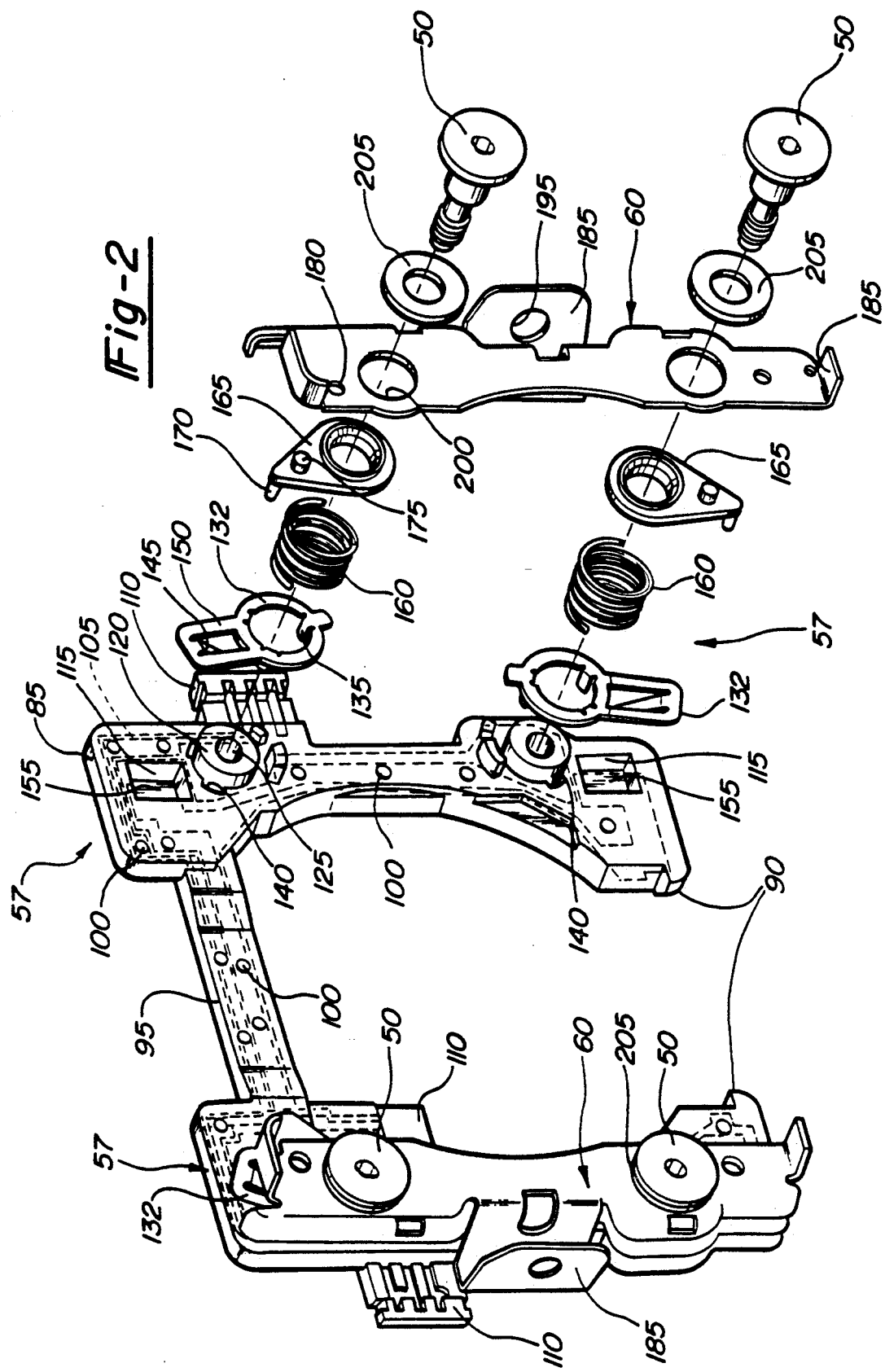
FIG. 2 is an exploded perspective view of a switching module employed in the present invention, as well as mounts therefor and mounting brackets and guides for an associated air bag module, mounted above the switching module.

Referring to FIGS. 1 and 2, electric switching module 55 comprises a generally U-shaped housing 85 molded from a thermosetting plastic or similar material. Housing 85 comprises a pair of generally parallel legs 90 connected by an integral bight portion 95. The legs and bight portion are provided with a number of drain holes 100 therein which provide drainage of water vapor which may condense within the housing and if not removed, adversely affect the performance of the switching module when the vehicle is operated in humid climates. Electric circuitry stamping 105 of copper or similar material is disposed within the housing and fixed therewithin preferably by insert molding during the formation of the housing. Electrical circuitry 105 provides all the circuit paths necessary for connection of the electrical controls such as cruise control switches 35 and 40 housed within the steering wheel to the aforementioned vehicle accessory wiring 32. To provide electrical connections between circuitry 105 and the wiring harness 32, switching module 55 is provided with electrical terminations 110 molded into the outer edges of legs 90. Preferably, terminations 110 comprise plug-in electrical receptacles 112 (see FIG. 1) at which the ends of the various circuit paths in stamping 105 terminate. These connectors will mate with corresponding connectors on the vehicle wiring harness 32 and the leads (not shown) wired to cruise control switches 35 and 40 mentioned hereinabove, as well as the connector on air bag module wire 70, whereby the switching module provides an electrical connection between all of such controls and the wiring harness.

Figure 3A:
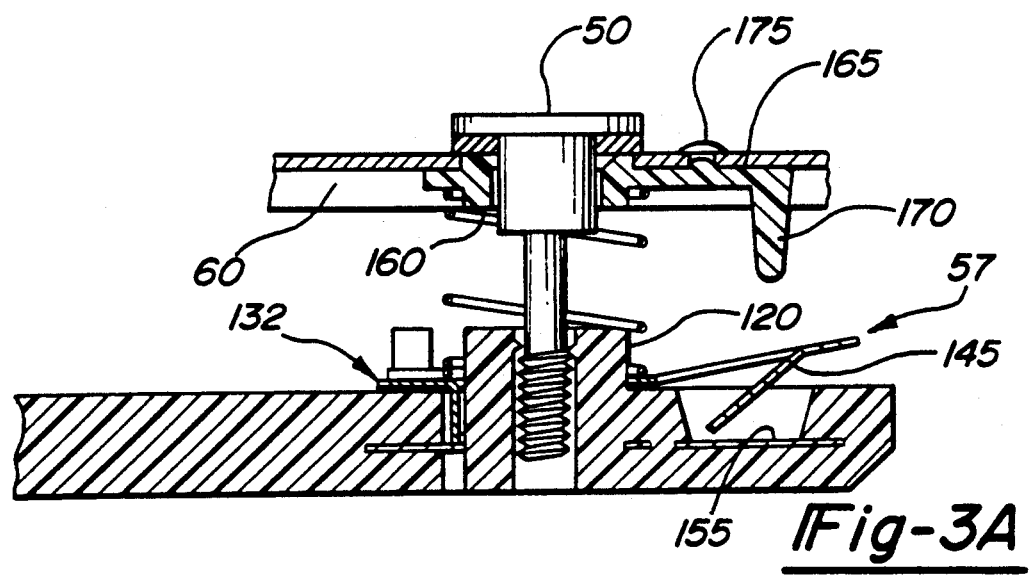
FIGS. 3a, 3b and 3c is a sequence of enlarged sectioned elevations of a portion of the apparatus shown in FIG. 2, illustrating the closing of a vehicle accessory switch disposed in the switching module upon depression of the associated air bag module.
Figure 3B:
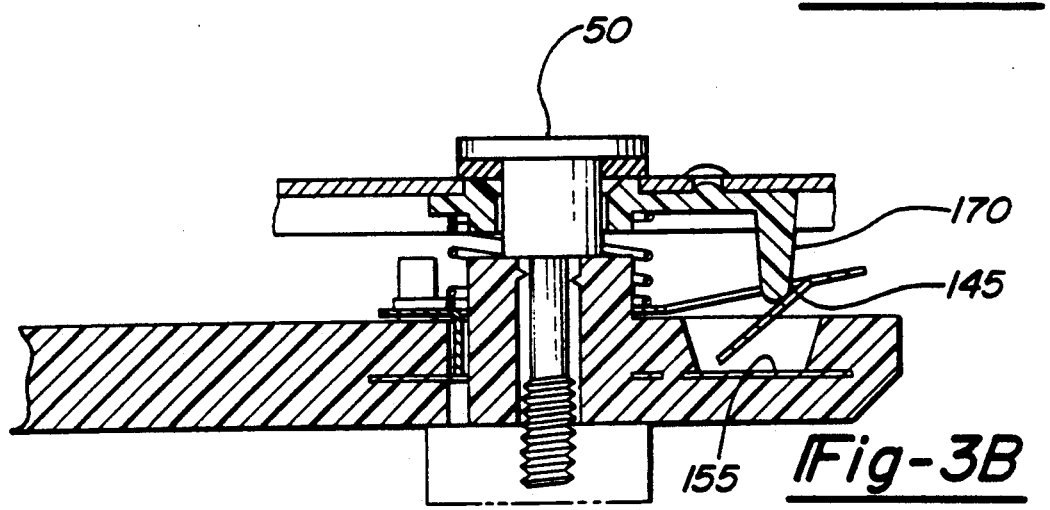
Figure 3C:
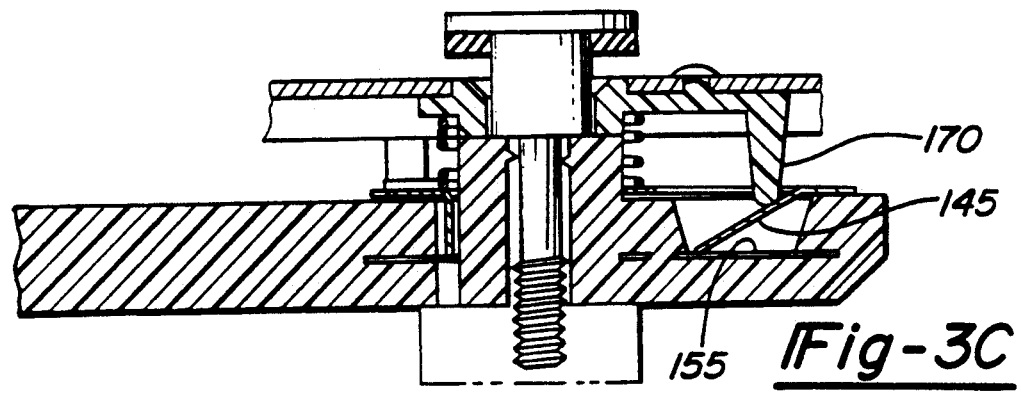

As best seen in FIG. 2, switching module legs 90 also include apertures 115 and standoffs 120 having bores 125 therethrough, molded into the legs. As best seen in FIG. 3, each of the bores 125 is provided with a single thread 130 which captures a corresponding shoulder bolt 50 when threaded into the bore, thereby allowing the bolts to be transported with the modules from the location of manufacture of the module to the location of assembly of the motor vehicle without separation from the module. Standoffs 120 also locate contacts 132 fitted over the standoffs, on the switching module. Contacts 132 comprise conductive stampings of a material such as copper and include a number of tangs 135 received within mating slots 140 molded into the legs of the switching module around the standoff to maintain the alignment of the contact with the switching module and therefore circuitry 105 therein. A movable contact (tang) 145 extending obliquely inwardly from a tab 150 makes contact with stationary contact 155 formed integrally with circuit stamping 105 and accessible by tang 145 through aperture 115.

Standoff 95 also locates coil spring 160, one end of which seats on that portion of contact 132 surrounding the standoff and the other end against the base of insulative plunger 165. Plunger 165 is provided with a first finger 170 which engages contact 120 when the air bag module and bracket 60 are pressed inwardly to actuate the horn, and a second finger 175 which is received within hole 180 in bracket 60 and peened thereover to hold the plunger in place. A pair of annular shoulders extending outwardly from the base of the plunger also maintain the location of the spring on the plunger and the location of the plunger on the bracket.

Bracket 60 is formed from a relatively heavy gauge structural material such as steel, aluminum or the like and includes a number of tabs or ears 185 which serve to locate the air bag module 65 thereon and fasten air bag module 65 thereto as by screws or similar fasteners 187 (see FIG. 1) received through mounting holes 190 in the air bag module and 195 in bracket 60. Apertures 200 in the mounting bracket are provided in alignment with the apertures in standoffs 120, contact 132, coil spring 160 and plunger 165. Shoulder bolts 50 are received through those aligned apertures, the heads of the shoulder bolts engaging brackets 60 by means of resilient, vibration absorbing washers 205. As is best seen in FIG. 3, the switching module and air bag module bracket are easily assembled by slipping contact 132 and coil spring 160 over standoff 120, and inserting shoulder bolt 50 through washer 205 and the aligned apertures in the assembly of the bracket, plunger and coil spring, and finally, threading the bolt into bores in the standoff and into bores 45 in the hub of the steering wheel. When it is desired to actuate the vehicle's horn, the air bag module is pressed downwardly, which in turn moves either or both brackets 60 supported on switching module 55 by coil springs 160, downwardly as well. As the bracket moves downwardly, plunger finger 170 engages oblique, movable contact 145 forcing the contact downwardly into engagement and electrical interconnection with stationary contact 155 to close the horn switch. As seen in FIG. 3, as movable contact 145 engages the stationary contact 155 it wipes across the stationary contact whereby the stationary contact is cleaned of such contaminants as dirt and metallic oxide. It will be seen that the shanks of the shoulder bolts function as guides for reciprocal movement of the bracket and the engagement of the shoulder on the shoulder bolt with the top of the standoff serving as a stop to limit downward movement of the air bag module and bracket.

It will be seen that four horn switches are provided in the switching module—one at each free end of legs 90 and one at the location of the juncture of legs 90 with bight portion 95.

Figure 4:
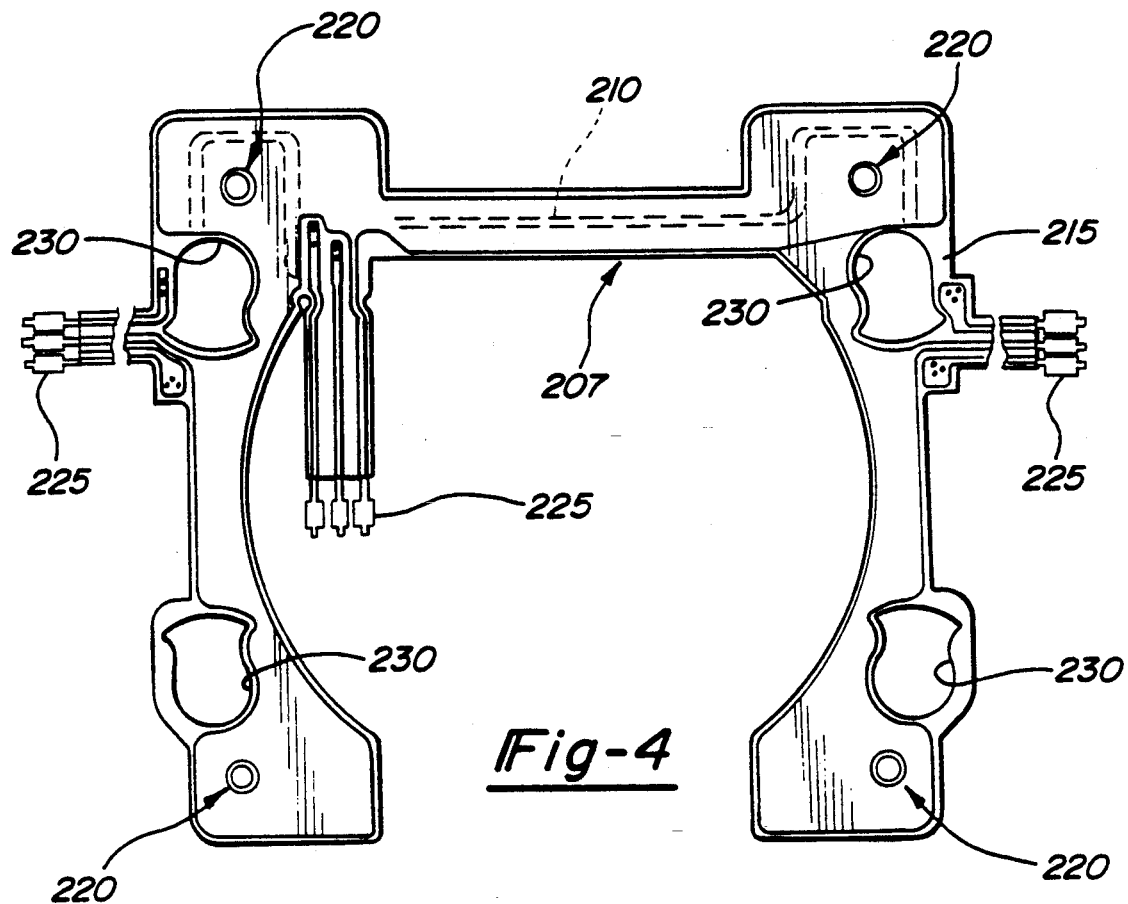
FIG. 4 is a plan view of an alternate embodiment of the switching module employed in the present invention.

Referring to FIG. 4, an alternate embodiment of the present invention is shown. In this embodiment, the switching module 207 is miniaturized by circuitry 105 being formed from one or more thin electrically conductive leaves 210 coated with a flexible insulation 215. This switching module includes a miniature dome switches 220 or equivalent miniature, pressure sensitive switches or signal generating means such as a force sensing resistor, or piezoelectric element or the like. As used herein, the term "switch" shall include all such signal generating means and any collateral electronic circuitry associated therewith. As is well known in the art, the dome switch comprises a resilient diaphragm formed integrally in the uppermost leaf overlying a stationary contact provided in the lower leaf. The leaves may be interconnected by an anisotropic adhesive which provides electrical conductivity at discrete locations on the leaves. Such an adhesive, consisting a polymer resin with conductive particles dispersed therein is manufactured and sold by Sheldahl Inc. under the trademark Z Link. A switching module manufactured with such materials and miniature switches is extremely thin—on the order of a few thousandths of an inch in thickness. Like switching module 55 described hereinabove, the switching module shown in FIG. 4 includes integral connectors 225 by which the controls mounted on the steering wheel as well as the horn switches are connected to the vehicle accessory wiring. Apertures 230 formed in the switching module may accommodate an arrangement similar to that shown in FIGS. 1-3 for mounting a bracket which supports an air bag module to the steering wheel hub by means of shoulder bolts or similar upstanding guide means and coil springs and the like for biasing the air bag module outwardly.

Figure 5:
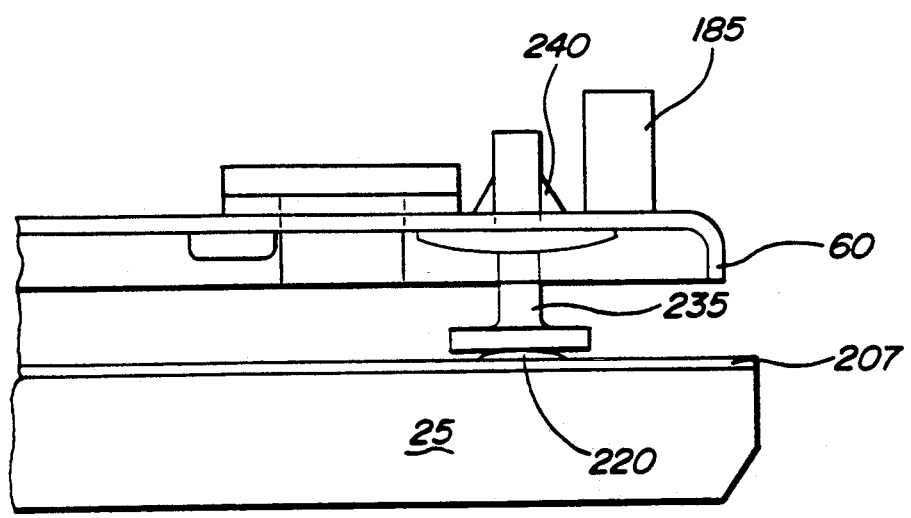
FIG. 5 is an enlarged fragmentary elevation of an assembly of a steering wheel hub, an air bag module mounting bracket and a switching module of the type shown in FIG. 4.

Referring to FIG. 5, the switching module 207 of FIG. 4 may be mounted the steering wheel hub 25 by any suitable means (not shown) such as clamps, adhesive bonding or the like. Collateral solid state circuitry (not shown) associated with a piezoelectric element or force sensing resistor employed in place of the dome switches may be mounted at any convenient location within the steering wheel hub such as between the two legs of the switching module. Air bag module mounting bracket 60 is disposed above the switching module and carries an inwardly projecting plunger 235 formed of any suitable rigid material such a metal or hard plastic. The plunger may be snapped into engagement with the bracket by locking tabs 240. The plunger is aligned with miniature dome switch 220 and upon inward movement of the air bag module, the plunger engages switch 220 forming an electrical circuit therethrough and energizing the horn. It will be appreciated that the miniaturization of the horn switches in this manner requires very little travel of the air bag module to energize the horn. Accordingly, actuation of the horn may be more quickly and easily accomplished by a driver and the clearances between the various moveable components may be reduced in size, thereby lending a steering wheel employing such a switching module an enhanced appearance.

It will be apparent that the present invention provides an enhanced scheme for electrically connecting vehicle accessories to automotive accessory wiring beneath an air bag module. Since the accessory (horn) switches are disposed within a single switching module, individual wires and metal stampings hand assembled to the steering wheel during vehicle assembly are not necessary. Accordingly, the expense associated with such hand assembly is reduced and reliability enhanced. Since the circuitry is embedded in the switching module, it is protected by the module and less likely to suffer damage from other components in the supplemental restraint system when the steering wheel is assembled. Indeed, neither wire retention clips nor shields to protect the wires from such damage are required with the present invention. Since the module is a unitary member, there is no risk that an assembler will inadvertently replace a left-hand with a right-hand circuitry stamping or wire subassembly which would result in inoperability of the electrical system within the steering wheel. Since the switching module is assembled prior to assembly with the motor vehicle, it may be assembled under controlled conditions where optimal quality control may be achieved.

While the present invention has been shown and described in conjunction with an air bag module in a motor vehicle steering wheel, it will be understood that the invention is equally useful in other applications such as, for example, passenger side air bag systems should such systems require the mounting of electrical accessories beneath the air bag module and actuation of such accessories by movement of the air bag module. The housing of the switching module of the present invention may itself be formed integrally with the steering wheel hub. While the switches employed in the switching module have been shown and described as horn switches, it will be appreciated that switches associated with any vehicle electrical accessory actuated by movement of the air bag module may be employed. Furthermore, while switching module 55 illustrated in FIGS. 1-3 and described in connection therewith, included mechanical switches 57, it will be understood that any of the miniature switches or signal generating means employed with switching module 207 illustrated in FIGS. 4 and 5, could be employed with equal utility in switching module 55. It is intended by the following claims to cover these and any other modifications which may fall within the true spirit and scope of the present invention.

Having thus described the invention, what is claimed is:

1. In a motor vehicle having electrical accessories and associated electrical accessory wiring, a supplemental restraint system comprising a module containing an air bag therein, said air bag module being mounted on at least one support bracket and at least one first electric switch actuated by depression of said air bag module for controlling the operation of said electrical accessories, said supplemental passenger restraint system also accommodating electric circuitry for providing electrical connections between said first electric switch and said electrical accessory wiring and between said air bag module and said electrical accessory wiring, the improvement characterized by:

said first electric switch comprising a portion of a generally unitary, electric switching module;

said electric circuitry being substantially entirely embedded within said electric switching module and connected to said electric switch;

said support bracket with said air bag module, being mounted in said passenger compartment in overlying proximity to said electric switching module; and said support bracket including means in alignment with said first switch for actuating said first switch when said air bag module is depressed.

2. The supplemental restraint system of claim 1 characterized by:

said supplemental passenger restraint system being disposed within the hub of a steering wheel; and said electrical circuitry including electric connectors integral therewith for providing electrical connections between said circuitry and said electrical accessory wiring.

3. The supplemental restraint system of claim 2 characterized by said steering wheel further incorporating at least one additional switch for controlling additional vehicle accessories;

said electrical circuitry providing electrical connections between said additional vehicle accessories and said electrical accessory wiring.

4. The supplemental passenger restraint system of claim 3 characterized by said additional vehicle accessory switch comprising a switch for a cruise control.

5. The supplemental restraint system of claim 2 characterized by:

said electric switching module comprising a rigid insulative housing and said circuitry comprising a metallic stamping molded within said housing;

said housing being generally U-shaped, including a pair of generally parallel legs connected by a transverse bight portion;

said at least one first electric switch comprising four horn switches, two of said horn switches being disposed at the free ends of said legs and two of said switches being disposed at the connection of said bight portion to said legs.

6. The supplemental restraint system of claim 5 characterized by:

said support bracket being resiliently mounted on said housing for reciprocal movement with respect thereto, in response to depression of said air bag module; and said horn switches comprising first, stationary contacts formed integrally with said electrical circuitry, and second contacts movable by said horn switch actuating means into engagement with said first contacts to close said horn switches when said air bag module is depressed.

7. The supplemental restraint system of claim 5 characterized by said housing being mounted to said steering wheel hub by bolts extending through said bracket, the shanks of said bolts functioning as guides for said reciprocal movement of said bracket and air bag module and the heads of said bolts comprising stops for limiting outward movement of said bracket and air bag module.

8. The supplemental restraint system of claim 7 characterized by said bolts extending through apertures in said housing, each of said apertures including at the interior thereof, at least a partial thread for retaining said bolt and bracket on said housing prior to mounting on said steering wheel hub.

9. The supplemental restraint system of claim 6 characterized by said horn switch actuating means comprising a plunger, and said movable contact comprising an elongate leaf spring engageable at a medial portion thereof by said plunger, whereby said second contact connects to said first contact by wiping thereacross to reduce a buildup of oxides and foreign matter on said contacts.

10. The supplemental restraint system of claim 6 characterized by said housing including drain holes proximally to the stationary contact of said horn switches for the draining of moisture therefrom.

11. The supplemental restrain system of claim 6 characterized by said movable contact comprising a resilient diaphragm overlying said first contact and normally disposed in a spaced orientation with respect thereto.

12. The steering wheel of claim 5 characterized by said bracket being mounted on coil springs secured to, and upstanding from said housing.

13. The steering wheel of claim 12 characterized by said housing including stops formed integrally in the outer surface thereof for limiting the inward movement of said bracket to prevent over- actuation of said horn switch.

14. The supplemental restraint system of claim 1 characterized by said support bracket being resiliently mounted in a steering wheel hub for reciprocal movement with respect thereto, in response to depression of said air bag module;
said circuitry comprising at least one thin, electrically conductive leaf; and
said electric switching module comprising said thin, electrically conductive leaf coated with an electrically insulative coating.

15. The supplemental restraint system of claim 14 characterized by:
said horn switch comprising a first, stationary contact formed integrally with a portion of said circuitry leaf; and
a second, movable contact comprising a resilient diaphragm overlying said first stationary contact and normally disposed in a spaced orientation with respect thereto.

16. The supplemental restraint system of claim 14 characterized by said horn switch comprising a pressure sensitive thin film, the resistance of which decreases to below a predetermined level required for conduction of sufficient electric current to actuate said horn, when subjected to greater than a predetermined force by said horn switch actuating means when said air bag module is depressed.

17. The supplemental restraint system of claim 1 characterized by said thin film comprising a force sensing resistor.

18. The supplemental restraint system of claim 16 characterized by said thin film comprising a membrane switch.

19. The supplemental restraint system of claim 16 characterized by said thin film comprising an anisotropic electrically conductive, pressure sensitive adhesive.

20. The supplemental restraint system of claim 14 characterized by:
said horn switch comprising a means for generating an electric signal for actuating said horn in response to mechanical pressure applied thereto by said horn switch actuating means when said air bag module is depressed.

21. The supplemental restraint system of claim 20 characterized by said signal generating means comprising a piezoelectric element.

* * * * *